United States Patent [19]

Delsarte

[11] 4,053,539

[45] Oct. 11, 1977

[54] PROCESS FOR THE PREPARATION OF GRAFTED COPOLYMERS

[75] Inventor: Jacques Delsarte, Villers Saint Sepulcre, France

[73] Assignee: Produits Chimiques Ugine Kuhlmann, Paris, France

[21] Appl. No.: 653,948

[22] Filed: Jan. 30, 1976

[30] Foreign Application Priority Data

Feb. 3, 1975 France .................................. 75.03229

[51] Int. Cl.$^2$ .................... C08F 255/04; C08F 255/06
[52] U.S. Cl. ................................................ 260/878 R
[58] Field of Search ..................................... 260/878 R

[56] References Cited

U.S. PATENT DOCUMENTS

| | | | |
|---|---|---|---|
| 3,515,774 | 6/1970 | Lee | 260/880 R |
| 3,538,190 | 11/1970 | Meredith et al. | 260/878 R |
| 3,538,191 | 11/1970 | Meredith et al. | 260/878 R |
| 3,538,192 | 11/1970 | Bishop, Sr. | 260/878 R |
| 3,538,193 | 11/1970 | Meredith | 260/878 R |
| 3,642,950 | 2/1972 | O'Shea | 260/880 R |
| 3,671,608 | 6/1972 | Meredith et al. | 260/878 R |
| 3,683,050 | 8/1972 | Meredith et al. | 260/878 R |

*Primary Examiner*—Alan Holler
*Attorney, Agent, or Firm*—Pennie & Edmonds

[57] ABSTRACT

This invention relates to a method of preparing graft polymers by mass polymerizing a mixture of polymerizable vinyl monomers in the presence of an elastomer to which the vinyl monomers are to be grafted, the elastomer being soluble in at least one of the vinyl monomers and also insoluble in at least one of the vinyl monomers, which comprises:

a. dissolving an elastomer in at least one monomer in which it is soluble;
b. initiating a mass prepolymerization reaction;
c. introducing the monomer or monomers in which the elastomer is insoluble during the prepolymerization reaction;
d. completing the addition of the monomer or monomers prior to the phase inversion of the reaction medium; and
e. completing the polymerization.

15 Claims, No Drawings

PROCESS FOR THE PREPARATION OF GRAFTED COPOLYMERS

BACKGROUND OF THE INVENTION

I. Field of the Invention

The invention relates to the preparation of graft polymers and specifically to the preparation of graft polymers which are resistant to impact and aging.

II. Description of the Prior Art

Thermoplastic vinyl polymers or copolymers reinforced by the presence of an elastomeric constituent imparting to the end product a resistance to impact very much higher than that of the unreinforced polymer or copolymer, can be prepared in various ways. One of the oldest known methods consists of mixing the elastomeric component and the thermoplastic component mechanically. This process has been gradually replaced by methods designed to improve the reinforcement provided by the elastomer to the thermoplastic matrix, and there have appeared on the market graft polymers prepared in very different ways: in solution, in emulsion, in mass, or in suspension.

The first two methods, polymerization in solution and in emulsion, lead to products which are difficult to purify and whose end properties are affected by the presence of various additives added during the polymerization. Mass polymerization avoids any contaminations. However, it is difficult to maintain a homogeneous temperature in the medium since the medium becomes very viscous during mass polymerization, and this difficulty tends to make the reaction unfeasible on an industrial scale.

The method of polymerization in suspension is similar to the mass polymerization method in that each droplet of the organic medium to be polymerized, isolated in the suspension fluid, generally water, is the site of a polymerization. However, if the conditions of thermal exchange are distinctly more favorable to the good progress of the polymerization, it is impossible in this method to act directly on the material contained in each droplet by, for example, agitating it in a controlled manner.

Techniques have been sought which make it possible to associate prepolymerization in the mass and postpolymerization in suspension to take advantage of each of the methods at the time when it is found to be most useful. Thus, there has appeared the "mass/suspension" method, which is now well-known. See, for example, French Pat. No. 1,220,440.

U.S. Pat. No. 3,278,642 discloses a mass/suspension method for preparing terpolymers of the ABS type (acrylonitrile/butadiene/styrene) by grafting a matrix of styrene/acrylonitrile resin to an elastomer. These products yellow when they are exposed to light, and subsequently various improvements have been proposed to eliminate this deficiency. U.S. Pat. No. 3,448,175 discloses a similar method in which at least one supplementary addition of styrene is carried out during the postpolymerization in suspension, thus making it possible to attenuate the tendency of the products to yellow.

The mass/suspension method can only be carried out to the extent to which the elastomer employed — polybutadiene or styrene/butadiene copolymer, for example — is soluble in the initial mixture of the monomers. In the case of ABS type polymers, the initial mixture is composed of styrene and acrylonitrile in a proportion by weight close to the azeotropic composition of 75/25.

Despite the improvements made in this method of manufacture, the products obtained with polybutadiene as the elastomer serving as the basis for the grafting, are not sufficiently resistant to atmospheric aging, although they have an interesting surface appearance and have good resistance to impact. This poor resistance to aging, which is evidenced by rapid decline in properties with exposure over a period of time, is apparently attributable mostly to the oxidation of the elastomer. The oxidation of polybutadiene, like the oxidation of all diene elastomers, brings about the breaking of the elastomer chains and results in the weakening of the good mechanical properties of the initial thermoplastic material over a period of time. Improvements of the resistance to aging of a polymer of this type have been made by replacing the sensitive elastomer with another elastomer which is much more resistant to oxidation.

In general, an elastomer with a low unsaturation level has been used, and the presence of double bonds in the principal chain of the elastomer has been avoided as much as possible. Accordingly, elastomers which are completely or almost completely saturated have been recommended or used. Examples of such elastomers are the following: ethylene-vinyl acetate copolymers (EVA), acrylic elastomers, unsubstituted or halogenated butyl rubbers, ethylene/propylene copolymers (EPR) or ethylene/propylene copolymers containing a third monomer providing lateral double bonds (EPDM), chlorinated polyethylenes (CPE), polymers or copolymers of epichlorohydrin and α-olefin oxide, and silicone elastomers.

Nevertheless, although the use of such elastomers as a basis for grafting has been known for many years, such knowledge has not up to now given rise to true industrial achievements because of various difficulties related to the use of these products during the grafting reaction. In order to pinpoint these difficulties, which the present invention has made it possible to overcome, it is necessary to examine a graft mass polymerization, as known and widely practiced. In order to obtain a grafted polymer G from a thermoplastic resin R by the graft polymerization of a mixture of monomer M on to an elastomer E — for example, an ABS type polymer in which R is a styrene/acrylonitrile resin, M is a mixture of styrene and acrylonitrile in given proportions, which proportions are usually close to the azeotropic composition of 75 parts by weight of styrene to 25 parts by weight of acrylonitrile, and E is an uncross-linked polybutadiene — the elastomer E is dissolved in a mixture of monomer M, this solution being subjected to a free radical mass polymerization by any process, which may be catalytic or thermal, or may be initiated by radiation. This polymerization is continued up to a conversion rate which is sufficient to pass the phase inversion stage.

The mass polymerization may be continued up to the desired conversion rate, which is generally limited by the viscosity of the reaction medium. One may then either eliminate the unreacted monomers by devolatilization, or continue the polymerization by a process which makes it possible to accommodate the increasing viscosities of the reaction medium. For example, the mass obtained may be suspended in water and the polymerization may be continued until the desired degree of conversion, generally between 99 and 100%, is obtained.

The method can be used without difficulty so long as the elastomer E used is soluble in the mixture of monomers M at the rate at which one wishes to use it, but the method fails if this condition is not achieved. The elastomer is considered soluble at a given temperature in the mixture of monomers M if after agitation for several hours at a given temperature in a finely-divided state with the mixture of monomers M, a homogenous liquid whose content of dissolved solid matter corresponds to the percentage of elastomer introduced into the mixture M, is obtained.

It has not been possible up to today to apply this known technique to the production of materials requiring the grafting of certain mixtures of monomers to certain types of elastomers. It has not been possible, for example, to achieve by this method the grafting of a styrene/acrylonitrile resin to an ethylene and propylene elastomer such the EPR elastomers (ethylene/propylene rubber) or the EPDM elastomers (ethylene/propylene/diene monomer) because these elastomers, even though they are soluble in styrene, are not soluble in the azeotropic styrene/acrylonitrile mixture. This azeotropic composition is generally used since it imparts to the final graft polymer certain desirable properties. Numerous attempts have been made to overcome this obstacle. It has been proposed in, for example, U.S. Pat. No. 3,461,188, to add to the medium a third inert solvent which makes it possible to dissolve effectively the elastomer in the mixture of monomers and third solvent. However, this method requires the elimination of the third solvent during or at the end of the polymerization, a step which is complicated and expensive. It has also been proposed, according to U.S. Pat. No. 3,538,192, that one should produce a pseudo-solution of the elastomer in the monomers by using a dispersing agent which may be a grafted product of the same components obtained previously by a different method. This technique has the disadvantages of not being very easy to practice and of requiring the prior preparation of the dispersing agent.

U.S. Pat. No. 3,515,774 discloses a method of dissolving the elastomer in the vinyl aromatic monomer alone in prepolymerization until after the phase inversion and then introducing the acrylonitrile prior to passing into suspension. However, this method has a very serious drawback: at the level of acrylonitrile usually employed, which is about 25 parts by weight of acrylonitrile to 75 parts by weight of styrene, the copolymer formed after the introduction of the acrylonitrile is incompatible with the styrene polymer previously formed during the first phase of the graft polymerization. The result of this is that the product obtained has a certain number of defects, two of which are the poor appearance of the surface of parts manufactured from this product and the mediocrity of its mechanical properties, particularly at low temperature. A similar method, as described in French Pat. No. 2,211,482, in which an acrylonitrile fraction is introduced after the phase inversion, leads to products having a resistance to impact at low temperature which is very much lower than the resistance of the products obtained according to the process of this invention.

SUMMARY OF THE INVENTION

Applicant has found that it is possible to prepare a graft polymer having good resilience and aging properties from a mixture of monomers and an elastomer by employing a method which avoids the use of a third inert solvent or a special dispersant. The quantity of elastomer to be used must be soluble in an aliquot part of the monomer mixture. In particular, the present invention relates to a method for the preparation of graft polymers by the mass prepolymerization of a mixture of at least two monomers in the presence of an elastomer soluble in at least one of the monomers and also insoluble in at least one of the monomers, followed by postpolymerization according to known techniques, such as, for example, in suspension. The stage of mass prepolymerization is characterized by (1) the elastomer, which is insoluble in the mixture of all the monomers, being previously dissolved in whole or in part in a solubilizing medium comprising all or part of one of the monomers of the said mixture, and (2) prior to the phase inversion, adding without causing precipitation, any remaining elastomer and monomer or monomers of the mixture which have not been introduced during the initial dissolving operation. According to this method, the whole of the monomers and of the elastomer is introduced into the reaction medium prior to the phase inversion which takes place during the mass prepolymerization.

DESCRIPTION OF THE PREFERRED EMBODIMENTS

The introduction of the supplementary fractions of the monomer or monomers to be added during the mass prepolymerization may be carried out either continuously or discontinuously in one or more steps; however it should be done at such a rate that the addition of these fractions does not bring about the precipitation of the elastomer. This manner of operation is feasible since as the prepolymerization in the mass proceeds, the elastomer is grafted and becomes progressively less insoluble in the whole of the monomer mixture.

The addition of these supplementary fractions is carried out so that it ends prior to the phase inversion. It is preferable, in order to obtain products possessing improved mechanical properties, for this addition to be completed before the rate of conversion of the monomers has reached the figure of about 7%.

The term "elastomer" also refers to a mixture of elastomers which is soluble in at least one of the monomers of the mixture of monomers and insoluble in at least one of the monomers of the mixture of monomers.

The phase inversion pheonomenon which takes place during the polymerization in mass is a well-known phenomenon which has been frequently described in literature such as, for example, in the following publications: — "Heterogeneous Polymer Systems IV Mechanism of rubber particle formation in rubber modified vinyl polymers" by G. E. MOLAU and H. KESKKULA. J. of Polymer Science 4, A-1, 1595 (1966); — "Mechanism of particle formation in rubber-modified vinyl polymers" by G. E. MOLAU and H. KESKKULA. Applied Polymer symposia No. 7, 35 (1968).

The phase inversion may be detected distinctly, either by a microscopic examination of the mixture during polymerization, or by following the development of the viscosity. The viscosity increases, passes through a maximum, and then decreases while the phase inversion takes place; it then increases again when the phase inversion has ended.

The preferred embodiment of this invention comprises initially dissolving the whole of the elastomer to be used in the solvent comprised of the whole or part of one of the monomers, and then gradually adding during the mass prepolymerization and prior to the phase inversion, the supplementary fractions of the monomer or monomers to be polymerized. However, it is possible only to dissolve initially a fraction of the elastomer in the solvent, the rest being dissolved in the whole or in an aliquot part of the additional monomer or monomers to be added during the mass prepolymerization in the mass prior to the phase inversion. This procedure would be appropriate in a situation in which three monomers were being grafted to an elastomer and the elastomer was soluble in two of the monomers but not wholly soluble in either of the two. Part of the elastomer would be first dissolved in one monomer; the remainder of the elastomer would then be dissolved in the second monomer, in which it was soluble, and the second solution would be gradually added to the reaction medium prior to the phase inversion.

Although the disclosed method is broadly applicable to the graft polymerization of mixtures of vinyl monomers to an elastomer in which the elastomer is soluble in at least one of the monomers of the monomer mixture and also insoluble in at least one of the monomers of the monomer mixture, the disclosed method is particularly advantageous for carrying out the prepolymerization/-grafting of a mixture of styrene or substituted styrenes and acrylonitrile or substituted acrylonitriles, to an elastomer. One embodiment of the invention which can be applied, for example, to elastomers which are soluble in styrene and insoluble in acrylonitrile, such as the EPDM elastomers, comprises dissolving the whole of the elastomer, preferably crushed, in about 30 to 100%, and preferably in about 70 to 100%, of the whole of the styrene and adding up to about 50% by weight, and preferably less than about 30% by weight, of the quantity of acrylonitrile necessary to obtain the azeotropic styrene/acrylonitrile composition, which composition is about 75/25 parts by weight, respectively. When the dissolution of this mixture is complete, the prepolymerization is initiated thermally or catalytically, and the remainder of the acrylonitrile is added continuously at a rate of flow such that this addition ends, at the latest, prior to the phase inversion, and preferably before the rate of conversion of the monomers has reached the figure of about 7%.

Another embodiment of the invention comprises dissolving the elastomer under the above conditions, initiating the prepolymerization, and adding the remainder of the acrylonitrile discontinuously in one or more steps when the conversion rates are sufficient, the last addition being prior to the phase inversion and preferably before the conversion rate of the monomers has reached about 7%.

A further embodiment of the invention comprises dissolving the elastomer in about 30 to 100% and preferably in about 70 to 100% of the whole of the desired styrene, then introducing a quantity of acrylonitrile which does not cause the precipitation of the elastomer, initiating the prepolymerization, and adding either continuously or discontinuously so as not to precipitate the elastomer, according to the development of the conversion rate, the rest of the acrylonitrile and the rest of the styrene either one after the other or simultaneously, the condition being to have finished these additions prior to the phase inversion and preferably before the conversion rate of the monomers has reached the figure of about 7%.

Another embodiment of the invention comprises dissolving the elastomer in the styrene alone, initiating the prepolymerization, and introducing the acrylonitrile either discontinuously or continuously with a rate of flow adjusted according to the degree of progress of the reaction so as to avoid the precipitation of the elastomer and so as to have finished this addition prior to the phase inversion and preferably before the conversion rate of the monomers has reached about 7%.

As has been explained previously, the present invention is applicable to grafting mixtures of monomers to elastomers which are soluble in at least one monomers of the monomer mixture and insoluble in at least one monomer of the monomer mixture. Many elastomers are useful; however, the EPR or EPDM elastomers are preferably recommended for the graftings carried out according to this invention, particularly a styrene type monomer being used with an acrylic type monomer. Other elastomers can, of course, be used, as would be readily appreciated by one skilled in the art, so long as the combination of elastomer and monomers meet the solubility-insolubility criteria set forth herein. The EPR elastomers or rubbers are generally obtained by the copolymerization of about 30 to 70 percent by weight of ethylene and about 70 to 30 percent by weight propylene. The EPDM elastomers or rubbers are generally obtained by the copolymerization of about 35 to 69 percent by weight of ethylene, about 65 to 30 percent by weight of propylene, and about 0.5 to 10 percent by weight of one or more dienes with unconjugated double bonds. Examples of suitable dienes which can be used include 1,4-hexadiene, 2,5-hexadiene, 2-ethylidene-5-norbornene, 2-methylene-5-norbornene, biscyclopentadiene, cyclooctadiene, and trivinylcyclohexane.

The elastomer compounds may be used either singly or in mixtures with one another. The quantity of elastomer, or mixture of elastomers, in the mixture of elastomer plus monomers may vary within wide proportions. It is advantageous to employ, from about 2 to 30 per cent by weight of the elastomer or mixture of elastomers. The preferred concentration is the range of from about 5 to 15 percent by weight of elastomer or mixture of elastomers, based on the weight of the total mixture.

Many different monomer mixtures are useful in the instant invention so long as the particular elastomer chosen for the graft polymerization is soluble in at least one of the monomers of the monomer mixture and also insoluble in at least one of the monomers of the monomer mixture. Thus, if it is desired to graft polymerize to a particular elastomer, one must then select at least one monomer in which the elastomer is soluble and at least one monomer in which this particular elastomer is insoluble. Conversely, if one selects a particular monomer mixture, then the elastomer must be selected so that it is soluble in at least one of the monomers and also insoluble in at least one of the other monomers of the monomer mixture. The preferred monomeric constituents are vinyl monomers and derivatives thereof. For example, when EPR or EPDM elastomers are used, one of the monomers can be a monovinyl aromatic compound, such as, for example, styrene, or a derivative of styrene, or a mixture thereof, in which these elastomers are soluble. Examples of derivatives of styrene include α-methylstyrene, o- and p-vinyl toluene, the vinylxylenes, vinylethylbenzene, isopropylstyrene, tertbutylstyrene, styrene substitued with one or more chlorine or bromine atoms.

One of the other monomers making up the monomer mixture, in which these elastomers are insoluble, can be acrylonitrile, its lower alkylated and/or halogenated derivatives, such as methacrylonitrile, unsaturated vinyl acids, such as acrylic, methacyrlic, maleic, and fumaric acids and their corresponding salts, lower alkyl esters, mineral or organic esters, and lower vinyl or lower vinylidene ethers, or mixtures thereof. Examples of these monomers include methyl acrylate, butylacrylate, 2-ethylhexyl acrylate, lower alkyl methacrylates, acrylamide, methacrylamide, and N-butylacrylamide. As long as the mixture of monomers complies with the elastomer solubility-insolubility criteria set forth herein, any such mixture of monomers grafted to such an elastomer in the manner described herein is in accordance with the disclosed invention. The preferred monomer mixtures include styrene and acrylonitrile, α-methylstyrene and acrylonitrile, and styrene and methyl methacrylate.

The mass prepolymerization/graft reaction is initiated in a known manner in the presence or absence of an initiator and at a temperature which is adapted to the constituents of the reaction mixture. In cases of thermal or catalytic initiation, the process is operated within a wide range of temperatures of between about 40° and 160° C. For a purely thermal polymerization the preferred range is 100° to 150° C. When the operation is carried out catalytically, polymerization initiators of the azoic or peroxide type or again of the per-salt or perester type are generally used. Examples of such initiators include azo-bis-isobutyronitrile, alkyl peroxides, aromatic alkyl peroxides, percarbonates, perpivalates, various alkyl peracetates, and various hydroperoxides and mixtures thereof. These catalysts may be introduced in one or more steps during the prepolymerization. Their overall quantity may vary, but it is generally between about 0.03% and 1%, based on the total mass of the prepolymer.

Either during or at the commencement of the prepolymerization, chain transfer agents aimed at limiting the growth of the macromolecular chains may be incorporated into the reaction medium. The best-known agents are the straight or branched mercaptans, the thio-ethers, the dimer of α-methylstyrene, and certain olefinic compounds.

It is also possible, and in certain cases even desirable, to add to the reaction mass aids such as, for example, anti-oxidants, lubricants, plasticizers, stabilizers, antistatic agents, anti-ultra violet agents, fireproofing agents, and coloring materials.

When the supplementary fraction of the monomer or monomers is added continuously to the reaction medium, it is important to regulate its rate of flow according to the development of the conversion rate of the monomers, that is, according to the parameters which regulate the speed of prepolymerization. Examples of such parameters include the nature of the monomers, the reaction temperature, and the nature and quantity of initiator.

When the addition to the reaction medium of the supplementary fraction of the monomer or monomers is carried out discontinuously, it is necessary to avoid any precipitation of elastomer in the said medium.

The second stage of the preparation of the products by the process of the invention, the post-polymerization, is carried out according to known processes. For example, the mass polymerization may be continued after the phase inversion, and then the grafted prepolymer may be suspended in an aqueous system containing a suspension agent and the polymerization concluded in suspension to form beads of polymer. The temperatures may range from about 50° to about 160° C, an autoclave being necessary at elevated temperatures. In order to facilitate this stage, an additional quantity of the initial initiator or another initiator intended, for example, to impart a certain degree of cross-linkage to the elastomer, can be added, generally prior to forming the suspension. Also, a modifier such as a mercaptan with a long alkylated chain may be added to regulate the molecular weight at this point.

The suspension agents which may be used are well known. Examples of such agents include partially hydrolysed polyvinyl acetates, hydroxy-ethyl-cellulose and other cellulose derivatives, and certain mineral agents, such as tricalcium phosphate. These suspension agents may possibly be associated with surface active agents, such as, for example, alkylaryl sulphonates or alkylaryl carboxylates, and alkyl sulphates.

At the end of the suspension cycle, the beads are collected, washed, and then dried.

The mass polymerization may also be continued beyond the phase inversion, in a known manner, either as far as the complete conversion of the monomers or as far as the time when the level of solid matter is of the order of about 50 to 60%. In each of these two cases medium chain transfer agents and possibly catalysts may also be incorporated into the reaction medium.

The graft polymers may be used as is, or granulated, and they may be converted by means of, for example, injection molding machines of the screw or piston types, single or double screw extruders, or calanders into useful objects.

According to the characteristics desired for the products manufactured from the graft polymers prepared according to this invention, these graft polymers may be used either alone or mixed with ungrafted resins or other compatible polymers or copolymers. For example, lubricants, anti-oxidants, anti-ultra violet agents, plasticizers, stablizers, fireproofing agents, dye-stuffs, mineral or organic fillers, reinforcing agents in powder form or in fiber form, such as glass, asbestos, or carbon fibers, or mixtures thereof, may be added to the graft polymers. Such addition can be carried out by means of well-known techniques and apparatus.

The graft polymers produced according to this invention are useful in the same manner and for the same purpose as the well-known ABS graft polymers disclosed in U.S. Pat. Nos. 3,278,642, 3,448,175, 3,461,188, 3,538,192, and 3,515,774 and French Pat. Nos. 1,220,440 and 2,211,482, all of which are cited above, but are more advantageous due to their improved impact resistance, tensile strength, and aging properties, as disclosed herein.

In the illustrative examples below the quantities of reagents or products mentioned are expressed by weight except where stated to the contrary. The standards used for the determination of the mechanical characteristics of the samples prepared are as follows:

Izod impact resistance ASTM D 256-56
Tensile strength ASTM D 638-58
Heat deflection temperature (HDT) under 18.5 kg after annealing at 85° C for 4 hours ASTM D 648-58 T

EXAMPLE 1

This example sets forth, for comparison purposes, the preparation and testing of three different graft polymers prepared according to a known process, the classic mass/suspension process. The results demonstrate that the mass/suspension process known in the prior art is not suitable for producing impact resistant graft polymers from elastomers which are insoluble in the mixture of monomers.

Elastomers Used

Test A: straight-chain polybutadiene elastomer with a Mooney viscosity of 40 containing 35% of cis-1,4, 10% of 1,2- vinyl, and 55% by weight of trans-1,4. This elastomer is soluble in the mixture of monomers.

Test B: EPDM elastomer with a Mooney viscosity of 40 containing 55% by weight of ethylene, 39% of propylene and 6% of ethylidene norbornene.

Test C: EPR elastomer with a Mooney viscosity of 40 containing 60% by weight of ethylene and 40% of propylene.

Mass Prepolymerization

Mixtures containing 100 g of each of the test elastomers in finely-ground form, 640 g of styrene, and 260 g of acrylonitrile were introduced into a 2-litre autoclave intended for mass polymerization. This mixture was agitated for 8 hours at ordinary temperature. The mixture was then heated to 110° C, while agitated at 500 r.p.m., for 4 hours.

For the Test A the prepolymer obtained contained about 28 percent by weight of solid matter and took the form of a stable dispersion containing the polybutadiene in the form of fine particles of a dimension of about 3 microns. For Tests B and C the prepolymer obtained was not homogenous. It contained particles of macroscopic size.

Post-polymerization in Suspension

In a 3-litre reactor designed for polymerization in suspension a solution of 1,000 g of water containing 1.5 g of partially hydrolysed polyvinyl acetate, the content of residual acetyl radicals being 15%, was prepared and then heated to 80° C. Next, 800 g of prepolymer to which 1.6 g of ditertiobutyl peroxide had been added as suspension catalyst were introduced. The mixture was agitated at 300 r.p.m. to bring this prepolymer into suspension in the water. The reaction mixture was heated for 4 hours at 130° C, 4 hours at 140° C, and 2 hours at 150° C. At the end of the suspension polymerization the beads of polymer were washed in hot water and then dried in a stove.

The Table below summarizes the mechnaical properties obtained for each of the products of the Tests A, B, and C.

| Test | A | B | C |
|---|---|---|---|
| Izod impact resistance at 23° C in kgf cm/cm | 18 | 2 | 2 |
| Tensile strength in kgf/cm² | 520 | 640 | 645 |

This Example shows that the classic mass/suspension process gives good results, i.e., produces a graft polymer having good impact resistance, with polybutadiene as the basic elastomer but that the process is not applicable to EPR and EPDM elastomers.

EXAMPLE 2

This Example groups together 5 tests carried out according to one of the embodiments of the disclosed invention.

Each of these 5 tests employed an EPDM elastomer of a Mooney viscosity of 35 containing 50 percent by weight of ethylene, 44 percent by weight of propylene, and 6 percent by weight of ethylidene norbornene. Table I below shows the respective quantities of the components in each of the tests as well as the various conditions of operation of prepolymerization in the mass and postpolymerization in suspension.

The mode of operation was as follows:

The finely-ground elastomer was dissolved in the styrene by agitating the mixture at 50° C for 8 hours in a 2-liter reactor intended for mass prepolymerization. The thermal prepolymerization was initiated by bringing the temperature to 120° C. The mixture was the agitated at the speed shown in Table I. The polymerization was allowed to continue for 5 minutes, and the quantity "a" of acrylonitrile shown in Table I was rapidly introduced.

The temperature was maintained at 115° C and the prepolymerization was continued until the phase inversion was passed. The prepolymer was cooled to 50° C. In each of the tests the prepolymer took the form of a stable dispersion containing particles of EPDM of a diameter varying between about 1 and 4 microns.

Next, the suspension catalyst or catalysts shown in Table I, were added by dispersing them in the prepolymer, and then that mixture was transferred to a 4-liter reactor intended for post-polymerization in suspension which contained 1,500 g of water and 2 g of partially hydrolyzed polyvinyl acetate, with a content of acetyl radicals in the vincinity of 15%, previously brought to 80° C. The prepolymer was dispersed in the water by agitating at 300 r.p.m. for 30 minutes at 80° C. The post-polymerization in suspension was then carried out according to the conditions of temperature and time described in Table I. At the end of the operation the polymers were washed with hot water and dried. The results of the mechanical tests carried out on these polymers are shown in Table I.

TABLE I

| | Tests | | D | E | F | G | H |
|---|---|---|---|---|---|---|---|
| Overall composition in g | EPDM | | 120 | 100 | 50 | 120 | 120 |
| | Styrene | | 660 | 685 | 720 | 640 | 620 |
| | Quantity "a" of acrylonitrile | | 220 | 215 | 230 | 240 | 260 |
| Prepolymerization | Speed of agitation (r.p.m.) | | 500 | 500 | 300 | 700 | 1000 |
| | Quantity of catalysts in g | TBP | 2 | 2 | 3 | — | 2 |
| | | PDC | 1 | 1 | 0.5 | — | — |
| | | DTBP | — | — | — | 2 | 0.5 |
| Suspension | | 110° C | 3 | 3 | 3 | — | 3 |

TABLE I-continued

| Tests | | D | E | F | G | H |
|---|---|---|---|---|---|---|
| | Times in 130° C | — | — | — | 3 | — |
| | hours at 135° C | 2 | 2 | 2 | — | 3 |
| | temperatures 140° C | — | — | — | 2 | 1 |
| | of: 150° C | — | — | — | 2 | — |
| | Izod 23° C in kgf cm/cm | 11 | 9 | 6 | 12 | 14 |
| | Izod 0° C in kgf cm/cm | 8 | 7 | 4 | 9 | 10 |
| Properties | HDT in C° | 100 | 101 | 100 | 101 | 101.5 |
| | Tensile strength in kgf/cm$^2$ | 579 | 585 | 640 | 570 | 565 |

TBP = t-butyl perbenzoate
PDC = dicumyl peroxide
DTBP = ditertiobutyl peroxide

EXAMPLE 3

This Example groups together five tests carried out according to one of the embodiments of the invention. These five tests employed an EPDM elastomer of a Mooney viscosity of 40 containing 55 percent by weight of ethylene, 39 percent by weight of propylene, and 6 percent by weight of ethylidene norbornene. Table II shows the respective quantities of the components in each of the tests as well as the various operating conditions of prepolymerization in the mass and post-polymerization in suspension.

The mode of operation was as follows:

The finely-ground elastomer was dissolved in the styrene by agitating at 50° C for 8 hours in a 2-liter reactor for mass prepolymerization. The temperature was brought to 80° C, and the quantity of acrylonitrile AN· shown in Table II was introduced rapidly. The solution remained homogenous in each case.

The temperature was brought to 110° C, and the agitation was carried out at the speed shown in Table II. The polymerization was allowed to continue for 15 minutes at 110° C, and then the whole of the acrylonitrile was introduced with a dosing pump over a period M shown at the rate flow of D, as shown in Table II. In all cases after this addition the prepolymer was not inverted. The polymerization was continued until the phase inversion was passed, and then the mixture was left at 110° C for 20 minutes.

The prepolymer was cooled to 40° C; the suspension or suspension catalyst according to Table II were added. The prepolymer was transferred into a 4-liter suspension reactor containing 1,500 g of water and 2 g of partially hydrolyzed polyvinyl acetate with a content of acetyl radicals in the vicinity of 15%, maintained at 80° C. The mixture was agitated for 30 minutes at 300 r.p.m., and then the polymerization in suspension is carried out in accordance with the conditions of time and temperature described in Table II. At the end of the operation the polymers were washed with hot water and dried. The results of the mechanical tests carried out on these polymers are shown in Table II.

TABLE II

| | Tests | | I | J | K | L | M |
|---|---|---|---|---|---|---|---|
| Overall composition in g | EPDM | | 80 | 100 | 100 | 120 | 120 |
| | Styrene | | 690 | 675 | 675 | 660 | 660 |
| | Acrylonitrile | | 230 | 225 | 225 | 220 | 220 |
| Prepolymerization | AN. in g | | 55 | 55 | 20 | 55 | 20 |
| | Speed of agitation r.p.m. | | 1000 | 500 | 1000 | 500 | 1000 |
| | Duration M in minutes | | 30 | 30 | 20 | 40 | 25 |
| | Rate of flow D in g/min | | 5.83 | 5.67 | 10.25 | 4.1 | 8.0 |
| | Catalysts (weight in g) | TBP | 2 | 1.5 | 1 | 2.5 | 2 |
| | | PDC | 0.5 | 0.5 | — | 0.5 | 1 |
| | | DTBP | 0.1 | — | 0.6 | — | — |
| Suspension | Duration in hours | 110° C | 3 | 3 | 2 | 3 | 3 |
| | | 135° C | 3 | 2 | 2 | 3 | 2 |
| | | 140° C | 1 | — | 2 | — | 1 |
| Properties | Izod at 23° C in kgf cm/cm | | 9 | 10 | 12 | 2 | 15 |
| | Izod at 0° C in kgf cm/cm | | 6 | 6 | 9 | 7 | 11 |
| | HDT in ° C | | 100 | 99 | 101 | 101 | 100 |
| | Tensile strength in kgf/cm$^2$ | | 620 | 600 | 590 | 580 | 565 |

EXAMPLE 4

This Example groups together 5 tests carried out according to one of the embodiments of the disclosed invention.

Tests N and O one employed an EPDM elastomer of a Mooney viscosity of 40 containing 66 percent by weight of ethylene, 29 percent by weight of propylene, and 5 percent by weight of dicyclopentadiene, and tests P and Q employed an EPR elastomer of Mooney viscosity 45 containing 50 per cent by weight of ethylene and 50 percent by weight of propylene. In test R the elastomer was a 50/50 by weight mixture of each of the two preceding elastomers. Table III shows the respective quantities of the components and the specific operating conditions for each of the tests, as well as the varous operating conditions for prepolymerization in the mas and post-polymerization in suspension.

The mode of operation was as follows:

The finely-ground elastomer was dissolved in the styrene by agitating the mixture at 50° C for 8 hours in a 2-liter reactor for mass prepolymerization. The quantity of prepolymerization catalyst shown was dissolved in the quantity AN· of acrylonitrile shown, and this solution was added rapidly to the prepolymerization reactor, which had been heated to 70° C. In all cases the solution remained homogeneous. The temperature of this solution was brought to $T_1°$ C, and then the solution was agitated at this temperature at 200 r.p.m. for H hours. At the end of this stage, the rate of conversion TC of the monomers was noted. In all cases the prepolymer was not inverted.

The temperature in the reactor was brought to 120° C, and the rest of the acrylonitrile was introduced rapidly through an air lock. The polymerization was continued for 1 hour at 120° C agitating at the speed V until the phase inversion was reached and passed. The prepolymer was cooled to 50° C, and the suspension catalysts were introduced.

The prepolymer was transferred to the 4-liter suspension reactor containing 1,500 g of water and 2 g of partially hydrolyzed vinyl acetate with a content of residual acetyl radicals of 15%, previously brought to 80° C. The prepolymer was dispersed in the water by agitating at 400 r.p.m. for 30 minutes at 80° C, and then the polymerization in suspension was carried out in accordance with the conditions of temperatures and of time shown in Table III. At the end of the operation the polymers were washed with hot water and dried. The results of the tests carried out on these polymers are shown in Table III.

EXAMPLE 5

This Example groups together 3 tests carried out according to one of embodiments of the disclosed invention. These three tests employed an EPDM elastomer of Mooney viscosity 35 containing 47% by weight of ethylene, 47% by weight of propylene, and 6% of ethylidene norbornene. Table IV shows the initial quantities of the components in each of these tests, as well as the final composition of the products obtained, the various operating conditions of the mass polymerization in the mass and the properties of the products obtained.

The mode of operation was as follows:

The elastomer was dissolved in the styrene by agitating for 8 hours at 50° C. This solution was introduced into a pressure-resistant autoclave, and it was brought to 150° C accompanied by very vigorous agitation. The polymerization was then initiated, and the total quantity of acrylonitrile was introduced at 150° C in less than 2 minutes. The polymerization was allowed to continue for the time T, at the end of which time the phase inversion had passed.

The prepolymer was cooled to 50° C. In both cases it took the form of a stable dispersion in which the inlets of EPDM had a dimension of about of 1 to 3 microns. The prepolymer was introduced into a second reactor designed for mass polymerization. Subsequently 1.5 g of ditertiobutyl peroxide and 1 g of tertiododecylmercaptan were introduced. The temperature was brought to 135° C, and the polymerization was allowed to continue until the prepolymer had a final solids content of TS. This prepolymer was then brought into a devolatiliser to free it from its residual monomers. The product obtained was then granulated to facilitate study of its mechanical properties.

TABLE IV

| Tests | | S | T | U |
|---|---|---|---|---|
| Solution (weight in | Elastomer (EPDM) | 92.5 | 137 | 196 |

TABLE III

| | Tests | | N | O | P | Q | R |
|---|---|---|---|---|---|---|---|
| Overall composition in g | Elastomer | | 100 | 120 | 100 | 120 | 120 |
| | Styrene | | 675 | 690 | 675 | 690 | 690 |
| | Acrylonitrile | | 225 | 230 | 225 | 230 | 230 |
| | AN. in g | | 55 | 50 | 55 | 50 | 50 |
| | Catalyst | | PPTB | PPTB | PL | PL | $BZ_2O_2$ |
| Catalytic | Weight of catalyst in g | | 0.3 | 0.4 | 0.3 | 0.4 | 0.3 |
| Prepolymerization | Temperature $T_1°$ C | | 70 | 70 | 70 | 70 | 75 |
| | Duration H in hours | | 4 | 4 | 3 | 3 | 3 |
| | TC (%) | | 2.5 | 4 | 3 | 5 | 4 |
| Thermal | Speed of agitation V in r.p.m. | | 500 | 500 | 800 | 500 | 800 |
| | Weight of catalysts in g | TBP | 2 | 2.1 | 2 | 2.1 | 2.1 |
| | | PDC | 1 | 1 | 0.3 | 0.3 | — |
| | | DTBP | — | — | — | — | 1 |
| Suspension | Duration in hours | 110° C | 3 | 3 | 3 | 3 | 3 |
| | | 135° C | 2 | 2 | 2 | 2 | 3 |
| | | 140° C | — | — | 1 | 1 | 2 |
| Properties | Izod 23° C in kgf cm/cm | | 15 | 19 | 10 | 12 | 18 |
| | Izod 0° C in kgf cm/cm | | 11 | 14 | 7 | 9 | 13 |
| | HDT in ° C | | 101 | 101 | 100 | 99 | 101 |
| | Tensile strength in Kgf/cm² | | 580 | 560 | 590 | 572 | 565 |

PPTB = tert-butyl peroxypivalate
PL = lauroyl peroxide
$BZ_2O_2$ = benzoyl peroxide

TABLE IV-continued

| | Tests | S | T | U |
|---|---|---|---|---|
| grams) | Styrene | 907.5 | 863 | 804 |
| Thermal polymerization in the mass | Acrylonitrile | 290 | 273 | 254 |
| Catalytic polymerization in the mass | Time T in minutes | 28 | 32 | 35 |
| | Final TS in % | 60 | 61 | 60 |
| Composition of the final product in % | Elastomer | 12 | 17.6 | 26 |
| | Styrene | 66.7 | 62.5 | 56.2 |
| | Acrylonitrile | 21.3 | 19.8 | 17.8 |
| Mechanical properties | Izod 23° in kgf cm/cm | 15 | 27 | 34 |
| | Izod 0° C in kfg cm/cm | 11 | 21 | 27 |
| | HDT in ° C | 98 | 98 | 99 |
| | Tensile strength in kgf/cm² | 570 | 390 | 350 |

EXAMPLE 6

In this Example, an EPDM of Mooney viscosity of 40 containing 55 percent by weight of ethylene, 39 percent by weight of propylene, and 6 percent by weight of ethylidene norbornene and an elastomer SBR (styrene butadiene rubber) of a Mooney viscosity of 35, containing 75% by weight of butadiene and 25% by weight of styrene, was employed. With 600 g of styrene, 120 g of EPDM and 30 g of SBR, these two elastomers having been finely ground, were placed into a 2-liter reactor and graft mass polymerized. The agitation was carried out at 150 r.p.m., and the mixture was heated to 50° C for 8 hours. A determination of the solid matter carried out after filtration give a figure of 19.9%, which signified that the elastomers were completely dissolved in the styrene.

The temperature was brought to 70° C, and 0.2 g of lauroyl peroxide were introduced into the reactor. Then, 45 g of acrylonitrile was added. After 2 hours at 70° C, the rate of conversion of the monomers was 1.5%. The temperature was then brought to 110° C to initiate the thermal polymerization, and then a mixture of 225 g of styrene and 150 g of acrylonitrile was rapidly introduced. The solution was agitated at 300 r.p.m. and heated at 110° C for 30 minutes. After 30 minutes of polymerization at 110° C the rate of conversion of the monomers was about 4%. Subsequently 120 g of styrene and then 210 g of acrylonitrile were introduced rapidly. The polymerization was continued at 110° C for 1 hour, and the prepolymer was then cooled to 60° C. A microscopic examination of the prepolymer showed that the phase inversion had taken place and that the elastomers were in the form of particles of a dimension in the vicinity of 2 microns.

Into a 4-liter reactor intended for polymerization in suspension, a solution of 1,500 g of water containing 4 g of partially hydrolyzed polyvinyl acetate with a content of acetyl radicals in the vicinity of 15%, was brought to 80° C. 3 g of t-butyl perbenzoate and 1.5 g of dicumyl peroxide were added to the prepolymer, and then the prepolymer was introduced into the suspension reactor. The mixture was agitated at 400 r.p.m. at 80° C to disperse the prepolymer in the water. The polymerization in suspension was continued for 3 hours at 110° C and then for 3 hours at 135° C.

The product obtained possessd the following mechanical properties:

| | |
|---|---|
| Izod impact resistance at 23° C: | 14 kgf cm/cm |
| Izod impact resistance at 0° C: | 10 kgf cm/cm |
| Tensile strength: | 565 kgf/cm² |
| HDT: | 101° C |

EXAMPLE 7

This Example describes the preparation of a graft polymer of styrene, α-methylstryrene and methyl methacrylate on to an EPDM elastomer with a Mooney viscosity of 35 containing 50 percent by weight of ethylene, 44 percent by weight of propylene and 6 percent by weight of ethylidene norbornene. 150 g of finely-ground EPDM was dissolved in 780 g of styrene and 105 g of α-methylstyrene by agitation at 50° C for 8 hours in a 2-liter mass polymerization reactor.

The temperature was brought to 80° C, and 100 g of methyl methacrylate was rapidly introduced. The solution remained homogeneous. The temperature was brought to 110° C while agitating at 300 r.p.m. The polymerization was continued for 15 minutes at 110° C, and then 365 g of methylmethyacrylate were introduced by means of a dosing pump in 45 minutes. The polymerization was continued until the phase inversion had passed, and 30 minutes later the prepolymer was cooled to 40° C.

In a 4-liter suspension polymerization reactor, a solution of 4 g of partially hydrolyzed polyvinylacetate (15% acyl groups) in 1,500 g of water was prepared and brought to 70° C, 4.5 g of lauroyl peroxide and 0.7 g of dicumyl peroxide were added to the prepolymer and then the prepolymer was introduced into a suspension reactor. It was heated while agitating at 300 r.p.m. for 6 hours at 70° C and then for 2 hours at 90° C.

The product obtained possessed the following mechanical properties:

| | |
|---|---|
| Izod impact resistance at 23° C: | 14 kgf cm/cm |
| Izod impact resistance at 0° C: | 9 kgf cm/cm |
| HDT: | 104° C |

EXAMPLE 8

A series of Xenotest artifical aging tests was carried out on the products of tests, K, N, and S.

The impact strength of these products was measured after 100, 400, and 1000 hours of artifical aging. The figures shown in table V are expressed as a percentage based on the initial value considered as equal to 100 in all cases. By way of comparison there is included the aging of an ABS mass suspension copolymer of test A.

Table V shows that the EPR or EPDM based terpolymers obtained according to the process of the invention have an aging property which is very much superior to the classic mass suspension ABS.

TABLE V

| Tests | 100 Hours | 400 hours | 1000 hours |
|---|---|---|---|
| K | 95 | 92 | 86 |
| N | 91 | 90 | 85 |
| S | 92 | 89 | 87 |
| A | 36 | 32 | 30 |

I claim:

1. A method of preparing grafted polymers by mass polymerizing a mixture of polymerizable vinyl monomers in the presence of an elastomer on which the vinyl monomers are to be grafted, the elastomer being soluble in at least one of the vinyl monomers and also insoluble in at least one of the vinyl monomers, which comprises:
   a. dissolving an elastomer in at least one monomer in which it is soluble;
   b. initiating a mass prepolymerization reaction;
   c. introducing the monomer or monomers in which the elastomer is insoluble during the prepolymerization reaction;
   d. completing the addition of the monomer or monomers during the prepolymerization reaction prior to the phase inversion of the reaction medium; and
   e. completing the polymerization.

2. The method of claim 1 wherein the monomer or monomers in which the elastomer is insoluble are added at a rate which will not cause the elastomer to precipitate.

3. The method of claim 1 wherein the elastomer is a mixture of elastomers.

4. The method of claim 1 wherein the mixture of monomers is comprised of at least one vinyl aromatic compound and acrylonitrile or methacrylonitrile, or a derivative thereof, said derivative being selected from methyl acrylate, butylacrylate, 2-ethylhexyl acrylate, lower alkyl methacrylates, acrylamide, methacrylamide, N-butylacrylamide, and mixtures thereof.

5. The method of claim 4 wherein the mixture of monomers is comprised of about 60 to 80 percent by weight of styrene and 40 to 20 percent by weight of acrylonitrile.

6. The method of claim 4 wherein the vinyl aromatic compound is selected from α-methylstyrene, o- and p-vinyl toluene, the vinylxylenes, vinylethylbenzene, isopropylstryene, tertbutylstyrene, styrene substituted with one or more chlorine or bromine atoms, and mixtures thereof.

7. The method of claim 1, step (a), wherein the elastomer is dissolved in about 30 to 100% of styrene.

8. The method of claim 7 wherein acrylonitrile is present in a quantity of up to about 50% by weight of the quantity necessary to obtain the azeotropic styrene/acrylonitrile composition.

9. The method of claim 1 by the wherein the elastomer is an EPR elastomer.

10. The method fo claim 1 wherein the elastomer is an EPDM elastomer.

11. The method of claim 1 wherein the elastomer consists of a mixture of elastomers.

12. The method of claim 1 wherein all of the elastomer being added to form the graft polymer is dissolved in at least one of the monomers in step (a).

13. The method of claim 1 wherein an aliquot part of the elastomer being added to form the graft polymer is dissolved in at least one of the monomers in step (a) and the remainder of the elastomer is added prior to the phase inversion.

14. The method of claim 1 wherein an aliquot part of the monomer or monomers in which the elastomer is insoluble is added in step (a).

15. The method of claim 1 wherein the monomer or monomers in which the elastomer is insoluble are introduced after the mass prepolymerization is initiated and prior to the phase inversion.

* * * * *